(12) United States Patent
Tsai

(10) Patent No.: US 6,175,110 B1
(45) Date of Patent: Jan. 16, 2001

(54) BUILT-IN SCANNERS HAVING A SWITCHED SINGLE LIGHT SOURCE

(75) Inventor: Jenn-Tsair Tsai, Pa Li Hsiang (TW)

(73) Assignee: Mustek Systems Inc., Hsinchu (TW)

( * ) Notice: Under 35 U.S.C. 154(b), the term of this patent shall be extended for 0 days.

(21) Appl. No.: 09/050,238

(22) Filed: Mar. 26, 1998

(30) Foreign Application Priority Data

Jul. 21, 1997 (TW) .................................................. 86212216

(51) Int. Cl.$^7$ ....................................................... H01J 3/14
(52) U.S. Cl. ............................................ 250/234; 358/475
(58) Field of Search .................................. 250/234, 235, 250/208.1; 358/474, 487, 475, 494; 355/53, 55

(56) References Cited

U.S. PATENT DOCUMENTS

| 5,574,274 | 11/1996 | Rubley et al. | 250/234 |
| 5,673,125 | 9/1997 | Merecki et al. | 250/234 |
| 5,710,425 | 1/1998 | McConica et al. | 250/234 |

*Primary Examiner*—Que T. Le
(74) *Attorney, Agent, or Firm*—Merchant & Gould P.C.

(57) ABSTRACT

The present invention discloses a built-in scanner that applies a single light source to scan both the reflective and the transparent documents according to their materials. After the single light source is properly switched, scan operations start to pick-up image information of the scanned documents. In addition, the single light source can be allocated outside the computer case for further increasing effective scanning range.

16 Claims, 4 Drawing Sheets

BUILT-IN SCANNERS HAVING A SWITCHED SINGLE LIGHT SOURCE

BACKGROUND OF THE INVENTION

1. Field of the Invention

The invention relates to a built-in scanner, and more particularly, to a built-in scanner that scans transparent and reflective documents by using single light source.

2. Description of the Prior Art

Science progresses have significantly brought many scanners to be manufactured for achieving kinds of requirements. Except a requirement of higher resolution, the scanners are requested to be standard equipment for building in a computer case.

Conventionally, the built-in scanners are usually constrained by usable spaces, and therefore the scanning range is serious influenced because the sizes of the mechanical and optical components can not be effective reduced. Furthermore, lights illuminated from two ends of the lamps are usually with insufficient brightness for scanning. For example, in the FIG. 4, it is obvious that the illuminating effective length 402 will be shorter than the lamp length 401. The darkest brightness of the illuminating effective length 402 is a half of the lamp center ($B_{0.5}$). A label 403 indicates a lamp length with at least 90% brightness of the lamp center ($B_{0.9}$), and ineffective parts that indicated by a label 404 are about 20 millimeters. Clearly, only the length indicated by the label 403 can be applied as a light source for scanning. Therefore, the effective range is constrained under the area of 4 inches by 6 inches.

Typical built-in scanners can only scan reflective documents, such as papers, photo, and business cards because the light source is usually allocated at the scanned side of the scanned documents. Those transparent documents such as projection slides or lantern slides can not be scanned directly in the conventional built-in scanners, and additional peripheral devices are needed for scanning such documents. A requirement has been arisen to disclose a built-in scanner, in which both the reflective and the transparent documents can be scanned without additional peripheral devices.

SUMMARY OF THE INVENTION

The object of the invention is to provide a built-in scanner that scans both the reflective and the transparent documents without additional peripheral devices.

Accordingly, the invention discloses a built-in scanner that applies a single light source to scan both the reflective and the transparent documents according to their materials. After the single light source is properly switched according to the materials of the scanned documents, scan operations start to pick-up image information of the scanned documents. In addition, the single light source can be allocated outside the computer case so as to further increase effective scanning range.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1A:
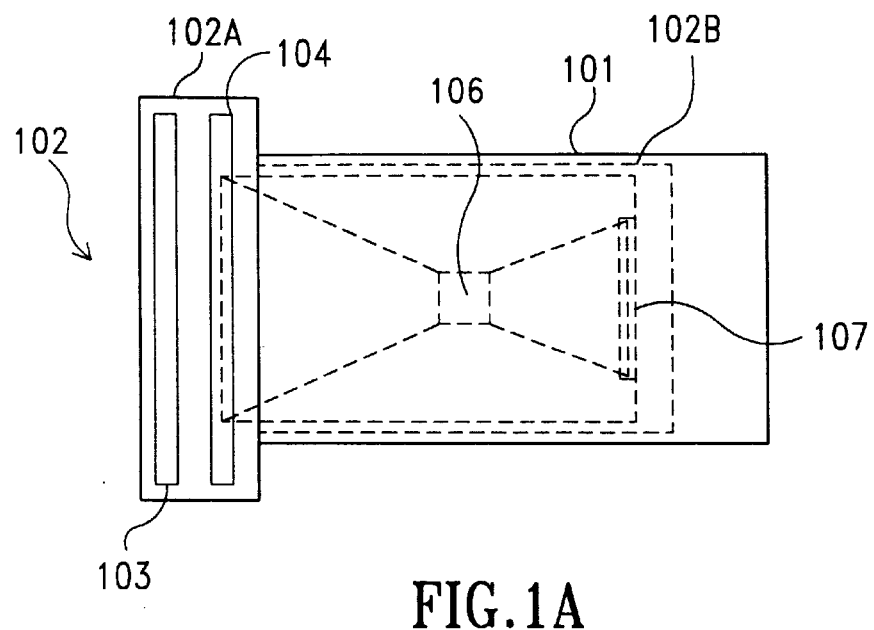
FIG. 1A is a top view illustrative of the structure diagram of the first embodiment.
Figure 1B:
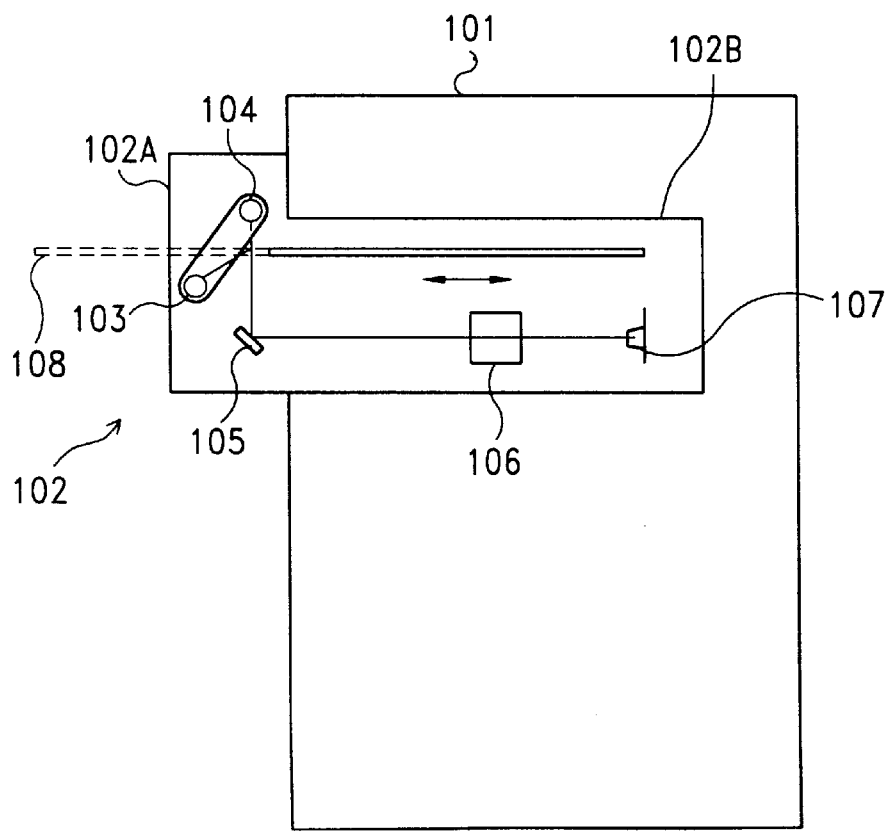
FIG. 1B shows a cross-sectional view representative of the structure diagram of the first embodiment.

FIGS. 1A and 1B respectively show a top view and a cross-sectional view representative of the structure of the first embodiment. The built-in scanner is fixed inside a computer case 101 by using a housing device 102 to expose a part 102A. On the other hand, part 102B of the housing device 102 is located inside the computer case 101. After the single light source switches to a position labeled 104 for scanning a transparent document, the lights illuminated from the single light source will penetrate the scanned document 108. The penetrated lights are then projected to a mirror 105 to penetrate a lens 106, and finally arrive to a CCD (Charge-Coupled Device) 107. Similarly, a reflective document can be scanned when the single light source switches to a position 103. The lights illuminated from the single light source will be reflected by the scanned document 108, and then directed to the mirror 105 to penetrate the lens 106 to the CCD 107.

Please note that the part 102A of the housing device 102 of the built-in scanner exposes outside the computer case 101, and the exposure part encompasses the single light source and the mirror 105. Because the width of the exposure part is longer than the width of the computer case 101, the single light source and the mirror 105 can be enlarged to increase the effective scanning width.

Figure 2A:
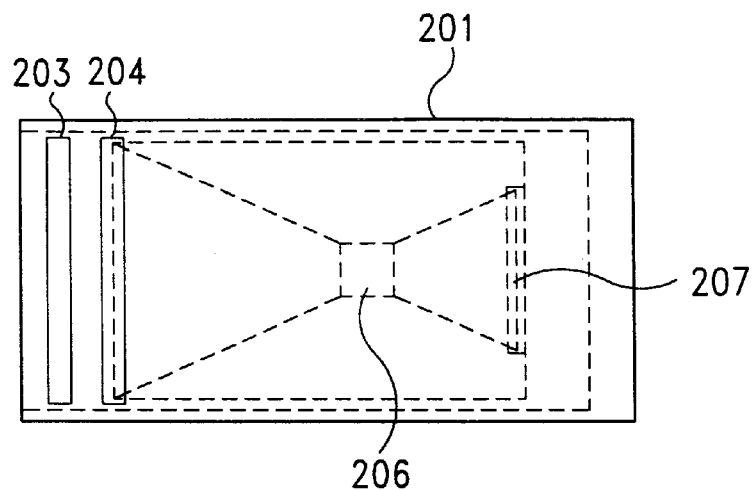
FIG. 2A describes a top view illustrative of the structure diagram of the second embodiment.
Figure 2B:
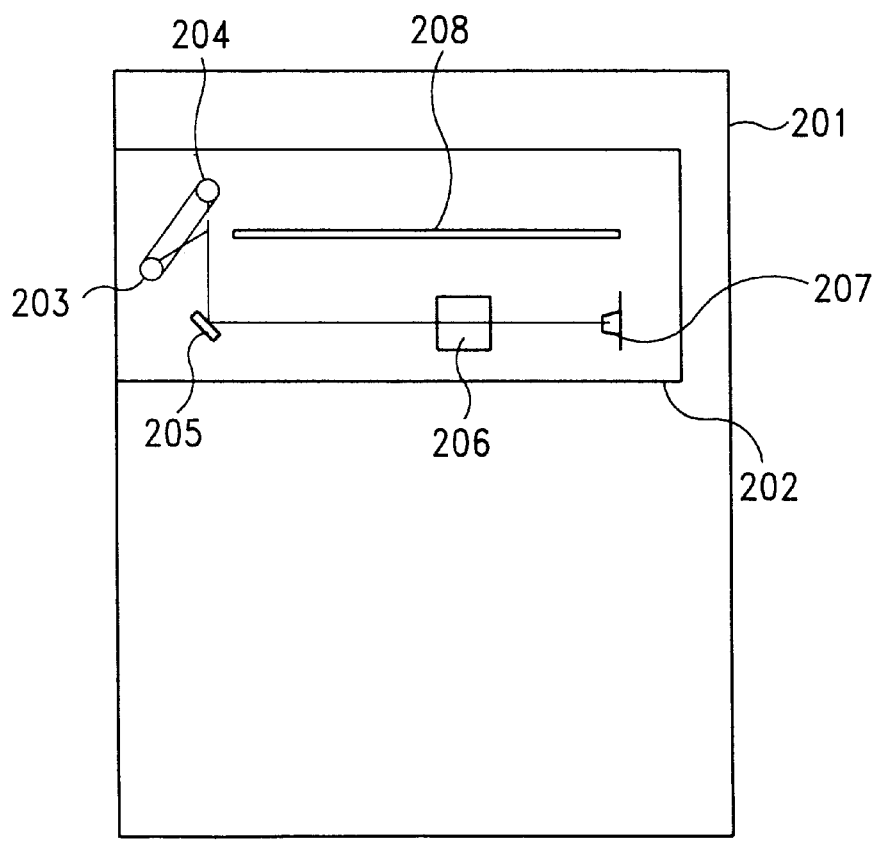
FIG. 2B describes a cross-sectional view representative of the structure diagram of the second embodiment.

FIGS. 2A and 2B respectively display a top view and a cross-sectional view illustrative of the structure of the second embodiment. In contrast to the first embodiment, the single light source switches at the two positions labeled 203 and 204 that are included inside the computer case 201 to respectively scan reflective and transparent documents. The built-in scanner is fixed inside a computer case 201 by using a housing device 202 as the first embodiment does. The optical path is similar to the counterpart of the first embodiment. When the scanned document 208 is a transparent document, the lights illuminated from the single light source will penetrate the scanned document 208 after the single light source switches to a position labeled 204. The penetrated lights are then directed to the mirror 205 to penetrate a lens 206, and finally arrive to the CCD (Charge-Coupled Device) 207. The reflective document can be scanned when the single light source is switched to the position 203. The lights illuminated from the single light source will be reflected by the scanned document 208, and then directed to the mirror 205 to penetrate the lens 206 to the CCD 207. It is obvious that the effective scanning range must be smaller the first embodiment.

Figure 3A:
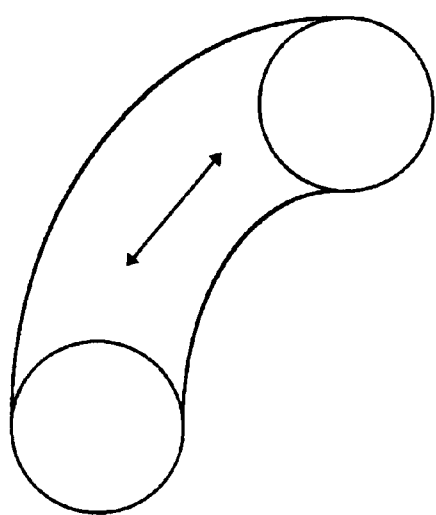
FIG. 3A shows a way of switching the single light source in the embodiments.
Figure 3B:
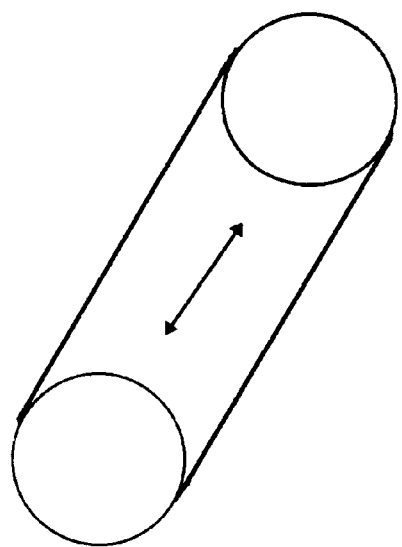
FIG. 3B is another way of switching the single light source.
Figure 4:
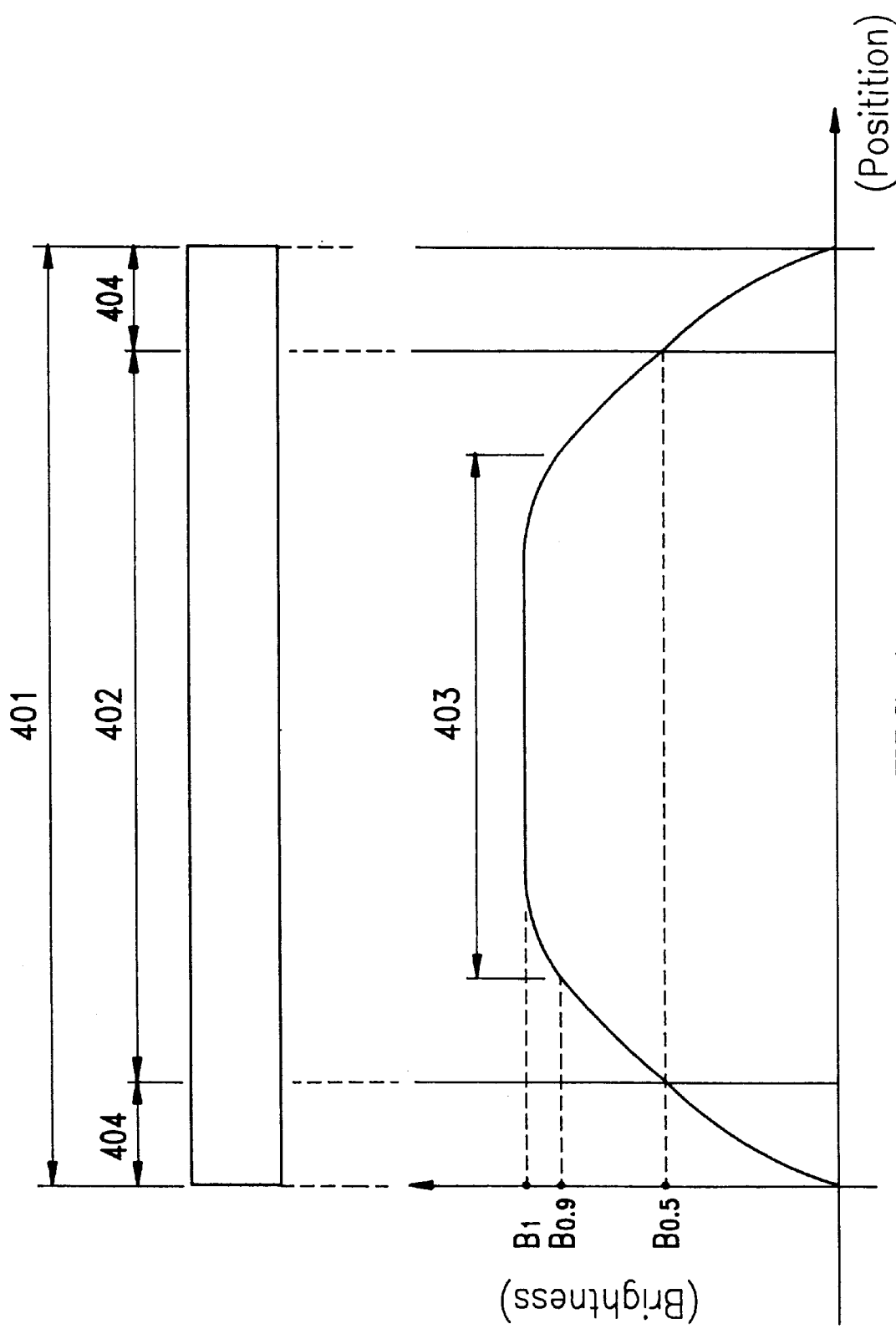
FIG. 4 describes the relations between the illuminating effective length and the effective scanning length of a lamp.

FIGS. 3A and 3B respectively show two ways of switching the single light source in the embodiments, wherein the single light source respectively moves along an arc or a straight-line path between the two positions for scanning. In addition, there is no further constraint to the built-in scanner such as dynamics' transference and feeding mechanism. Dynamics' transference used in conventional scanners, such as applying gear sets, racks, transmission axes, or wires are adapted to transfer dynamics from motors. In addition, the light source switching mechanism can be achieved by using a button outside the housing device, or under controlled by software, and the single light source must encompass at least a lamp for illuminating lights. Furthermore, rollers and a tray (or a cassette) used conventionally are also employed as a mechanism for feeding the scanned document into the built-in scanner.

In conclusion, the present invention discloses a built-in scanner that applies a single light source to scan both the reflective and the transparent documents according to their materials. After the single light source is properly switched, scan operations start to pick-up image information of the scanned documents. In addition, the single light source can be allocated outside the computer case for further increasing effective scanning range.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A built-in scanner housed in a computer case that scans a document by using a single light source, wherein said built-in scanner comprises:

feeding means for feeding said document into said built-in scanner, light illuminating means including said single light source for illuminating lights to project to said document, said single light source being switched to a first position for illuminating said lights to penetrate said document, said single light source being switched to a second position for illuminating said lights to said document, said document reflecting said lights from said second position; and image generating means for generating image information of said document.

2. The built-in scanner according to claim 1, wherein said feeding means comprises a tray.

3. The built-in scanner according to claim 1, wherein said image generating means comprises:

reflecting means for reflecting said lights from said document; and image pick-up means responsive to said lights reflected by said reflecting means for generating said image information.

4. The built-in scanner according to claim 3, wherein a first portion being exposed outside said computer case, and a second portion being allocated inside said computer case, parts of said reflecting means being allocated inside said first portion of said housing device.

5. The built-in scanner according to claim 4, wherein said reflecting means comprises at least one mirror being allocated inside said first portion of said housing device, wherein a portion of said feeding means is allocated inside said first portion of said housing device.

6. The built-in scanner according to claim 3, wherein a portion of said feeding means is allocated inside said first portion of said housing device.

7. The built-in scanner according to claim 3, wherein said image pick-up means comprises a CCD (Charge-Coupled Device, CCD) sensor and at least one lens.

8. The built-in scanner according to claim 4, wherein said light illuminating means being allocated in said first portion of said housing device.

9. The built-in scanner according to claim 8, wherein said light illuminating means comprises at least one lamp.

10. The built-in scanner according to claim 9, wherein a width of said lamp is longer than a width of said computer case that said second portion of said housing device being allocated.

11. A built-in scanner housed in a computer case that scans a document by using a single light source, wherein said built-in scanner comprises:

feeding means for feeding said document into said built-in scanner;

light illuminating means including said single light source for illuminating lights to project to said document, said single light source being switched to a first position for illuminating said lights to penetrate said document, said single light source being switched to a second position for illuminating said lights to said document, said document reflecting said lights from said second position; and image generating means for generating image information of said document, parts of said image generating means exposes outside said computer case;

wherein a first portion being exposed outside said computer case, and a second portion being allocated inside said computer case.

12. The built-in scanner according to claim 11 wherein said feeding means comprises a tray.

13. The built-in scanner according to claim 11, wherein said image generating means comprises:

reflecting means for reflecting said lights from said document; and image pick-up means responsive to said lights reflected by said reflecting means for generating said image information.

14. The built-in scanner according to claim 13, wherein said reflecting means comprises a CCD (Charge-Coupled Device, CCD) sensor.

15. The built-in scanner according to claim 11, wherein said light illuminating means comprises at least a lamp.

16. The built-in scanner according to claim 15, wherein a width of said lamp is longer than a width of said computer case.

* * * * *